No. 657,819. Patented Sept. 11, 1900.
H. D. GOODRICH.
BED PAN.
(Application filed Mar. 19, 1898. Renewed July 26, 1900.)
(No Model.)
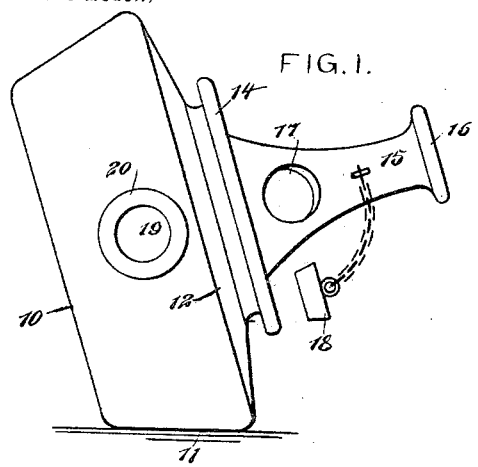
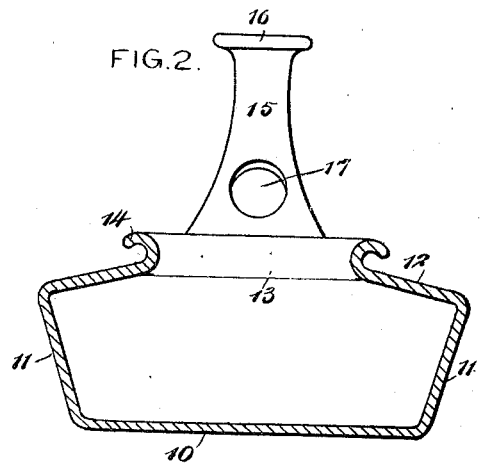
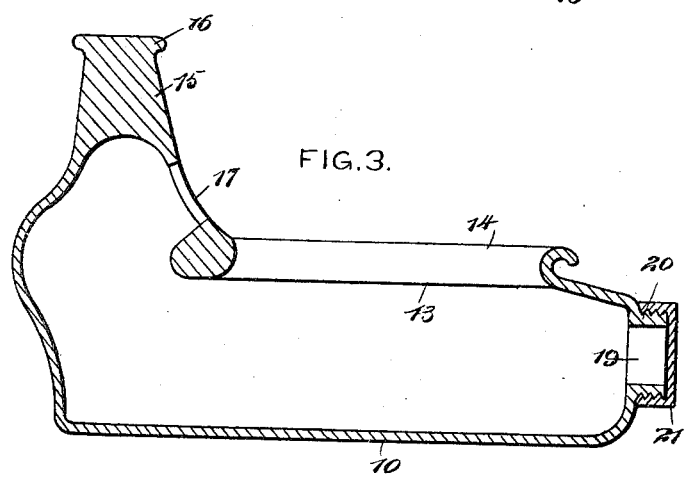
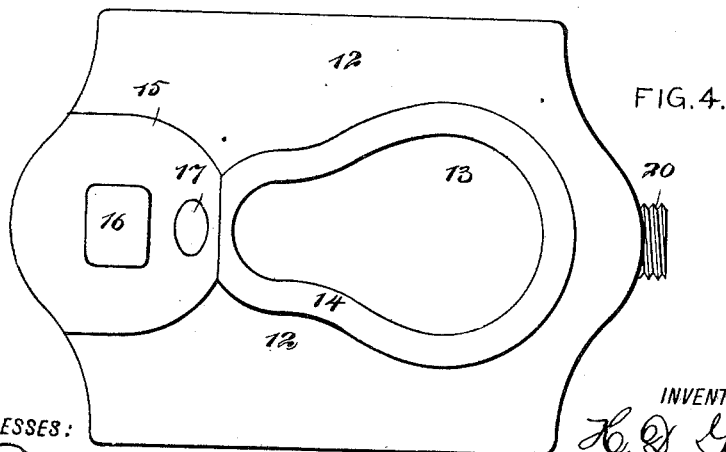
WITNESSES:
INVENTOR
H. D. Goodrich
BY
ATTORNEYS.

UNITED STATES PATENT OFFICE.

HARRIET D. GOODRICH, OF AUGUSTA, GEORGIA.

BED-PAN.

SPECIFICATION forming part of Letters Patent No. 657,819, dated September 11, 1900.

Application filed March 19, 1898. Renewed July 26, 1900. Serial No. 24,962. (No model.)

*To all whom it may concern:*

Be it known that I, HARRIET D. GOODRICH, of Augusta, in the county of Richmond and State of Georgia, have invented a new and useful Improvement in Bed-Pans, of which the following is a full, clear, and exact description.

The object of my invention is to construct a bed-pan which will do away with the unpleasantness and discomfort of the patient lying on the back and having the vessel placed beneath the body, thus causing the back to come in contact with so much cold surface, and to construct a bed-pan which may be safely and comfortably used while the patient is reclining on either side, which pan will be of a thoroughly-sanitary character, of a neat appearance, and capable of being conveniently handled by an attendant and held in position by the patient with the least possible amount of exertion.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is an end view of the improved bed-pan in position for use. Fig. 2 is a transverse section through the pan. Fig. 3 is a longitudinal vertical section through the pan, and Fig. 4 is a plan view of the improved bed-pan.

The pan may be made of any desired material, and its body may be given any desired contour. Preferably, however, it is mainly rectangular, as illustrated. The bottom 10 of the pan is preferably flat, as are likewise both sides 11, the sides and bottom being flat both longitudinally and transversely; but the sides 11 are given an inclination outwardly in opposite directions from the bottom, whereby the top of the pan is wider than its bottom portion. The pan is adapted to rest upon one or the other of its sides, as shown in Fig. 1, and when so resting will be balanced to such an extent that it cannot easily be turned over. The top portion 12 of the pan ascends from the sides in direction of the longitudinal center, and in the aforesaid top portion of the pan the main opening 13 is produced, and this opening is of oval form, wide in the rear and narrow in the front and is finished off with an outwardly-rounded rim 14, causing the pan to rest securely and comfortably between the groins and at the same time the rim encircles the pelvis and receives the matter expelled without any fear of accident.

At the forward end of the opening 13 a horn 15 is formed, which extends upwardly or outwardly from the upper face of the pan and is of tapering form, being widest at its base, and preferably the side walls of this horn may be more or less concaved, and the horn terminates at its upper or outer end in a cap 16. This horn is to be grasped in transporting the vessel from place to place, and the upper portion of the horn is usually made solid, as shown in Fig. 3. In fact, the horn serves as a retaining-lug, since when the pan is placed in position for service this horn or lug is placed between the legs of the patient and the patient while lying perfectly comfortable on the side will be able to hold the vessel in position and without tiring the uppermost leg. The horn or retaining-lug is provided in the front near its base with an opening 17, which leads into the chamber of the vessel, as is clearly shown in Fig. 3. A stopper 18 is provided for the opening 17, and at the rear end of the vessel an outlet-opening 19 is formed, surrounded, preferably, by a threaded collar 20, which collar is arranged to receive a removable cap 21. The vessel may be flushed through the opening 19, and the contents may be emptied therefrom at this point.

The rounded rim 14 at the main opening 13 is very convenient for the patient or the nurse to grasp if there is any likelihood of an accident, and the rim will be finished off so that it may be used to this end.

As heretofore stated, the main object of this pan is to do away with the unpleasantness of lying upon the back and having a vessel placed underneath the body, thus causing the back to come in contact with a considerable cold surface. When the pan is constructed as described, no cold surface need touch the body excepting a ring such as would contact with the body in a sitting position in health. Even the front projection or retaining-lug does not come in contact with the flesh, as the night-clothing drops naturally between it and the body and without any risk whatever of soiling the clothing protects the patient from the shock of a cold surface. The peculiar formation of the vessel and the presence of the retaining-lug effectually prevents any of the discharges from the body from escaping from the pan when in use.

The opening 17 is employed when the pan is used in connection with a male patient. Otherwise the opening 17 may be closed by the stopper 18, and even after the opening 17 has been brought into use and then closed by the stopper 18 the foul gases will be prevented from reaching a nurse or patient to any serious extent, thereby rendering the vessel exceedingly valuable from a sanitary point of view.

The vessel may be applied to a patient, no matter how sick, with but little trouble on the part of the operator or inconvenience on the part of the patient.

Having thus described my invention, I claim as new and desire to secure by Letters Patent—

1. A bed-pan having its side surfaces flat and beveled whereby the said pan is adapted to rest upon either of the said side surfaces when in use, the pan being further provided with a retaining-lug near one end, adapted to be received between the legs of the patient, as and for the purpose set forth.

2. A bed-pan having its sides flat and beveled, being adapted to rest upon either of the said sides when in use and provided with a retaining-lug near one of its ends, shaped to be held between the legs of a patient, the upper opening in the pan being surrounded by an outwardly-curved rim, whereby the said rim will serve as a handhold in addition to its function as a smooth support for the body of the patient, as and for the purpose specified.

3. A bed-pan provided with flat and beveled sides, being adapted to rest upon one of the said sides when in use, and further provided with a retaining-lug near one of its ends, shaped to enter between the legs of the patient and to be held thereby, the said retaining-lug having an opening which is in communication with the main chamber of the vessel, as and for the purpose set forth.

4. A bed-pan provided with flat and beveled sides, being adapted to rest upon one of the said sides when in use, and further provided with a retaining-lug near one of its ends, shaped to enter between the legs of the patient and to be held thereby, the said retaining-lug having an opening which is in communication with the main chamber of the vessel, the opening in the upper face of the body being surrounded by an outwardly-curved rim, as and for the purpose specified.

5. A bed-pan the body of which is provided with a flat rim and flat sides, the sides being flat longitudinally and transversely and inclined from the bottom outwardly in opposite directions, the top of the body of the vessel being inclined from the sides upwardly in direction of the center of the vessel, the said upper surface of the vessel being provided with a main opening surrounded by an outwardly-curved rim, and a retaining-lug located near one end of the vessel, shaped to be received between the legs of the patient, the said retaining-lug being provided with an opening which is in communication with the main chamber of the vessel, and means for closing the said opening, as and for the purpose specified.

HARRIET D. GOODRICH.

Witnesses:
P. M. BOYCE,
W. S. MORRIS.